US009191575B2

(12) United States Patent (10) Patent No.: US 9,191,575 B2
Takeuchi (45) Date of Patent: Nov. 17, 2015

(54) IMAGE STABILIZATION APPARATUS, IMAGE CAPTURE APPARATUS COMPRISING THE SAME, AND CONTROLLING METHODS THEREOF

(75) Inventor: Kenji Takeuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 13/602,964

(22) Filed: Sep. 4, 2012

(65) Prior Publication Data

US 2013/0063615 A1 Mar. 14, 2013

(30) Foreign Application Priority Data

Sep. 13, 2011 (JP) ................................. 2011-199934

(51) Int. Cl.
*H04N 5/228* (2006.01)
*G03B 17/20* (2006.01)
*G03B 17/00* (2006.01)
*H04N 5/232* (2006.01)

(52) U.S. Cl.
CPC ....... *H04N 5/23258* (2013.01); *H04N 5/23287* (2013.01); *G03B 2205/0015* (2013.01); *G03B 2217/005* (2013.01)

(58) Field of Classification Search
CPC ............ H04N 5/23264; H04N 5/2328; H04N 5/23287; H04N 5/23293; H04N 5/23296; H04N 5/2353
USPC ........ 348/208.5, 208.1, 208.2, 208.4, 208.11, 348/208.12, 208.13; 396/296, 55
See application file for complete search history.

(56) References Cited

U.S. PATENT DOCUMENTS

| | | | |
|---|---|---|---|
| 6,078,751 A * | 6/2000 | Yamazaki et al. | ............... 396/55 |
| 6,091,448 A * | 7/2000 | Washisu et al. | .......... 348/208.16 |
| 6,414,715 B1 | 7/2002 | Sato | |
| 8,593,533 B2 * | 11/2013 | Saito et al. | ............... 348/208.99 |

(Continued)

FOREIGN PATENT DOCUMENTS

| | | |
|---|---|---|
| CN | 101516000 A | 8/2009 |
| CN | 102065216 A | 5/2011 |

(Continued)

OTHER PUBLICATIONS

The above patent documents were cited in a Nov. 15, 2014 Chinese Office Action, which is enclosed with an English Translation, that issued in Chinese Patent Application No. 201210340245.X.

(Continued)

*Primary Examiner* — Sinh Tran
*Assistant Examiner* — Xi Wang
(74) *Attorney, Agent, or Firm* — Cowan, Liebowitz & Latman, P.C.

(57) ABSTRACT

When a shutter speed in shooting by an image capture apparatus using an image stabilization apparatus is higher than a first predetermined value and lower than a second predetermined value which is higher than the first predetermined value, a shake compensation driving unit sets the movable range of a shake compensation lens to be wider than that when it is lower than the first predetermined value or higher than the second predetermined value. While providing an anti-shake capacity necessary for the situation, a phenomenon in which the shake compensation lens stays at a maximum driving position and degradation of the image quality caused by deviation of the shake compensation lens from the center of the optical axis can be suppressed.

10 Claims, 12 Drawing Sheets

(56) References Cited

U.S. PATENT DOCUMENTS

| | | | |
|---|---|---|---|
| 2002/0027599 A1* | 3/2002 | Yamazaki | 348/208 |
| 2006/0033817 A1* | 2/2006 | Ishikawa et al. | 348/208.2 |
| 2006/0165396 A1* | 7/2006 | Yamazaki | 396/55 |
| 2007/0189745 A1* | 8/2007 | Masuda | 396/55 |
| 2007/0211236 A1* | 9/2007 | Shinonaga | 355/67 |
| 2008/0080053 A1* | 4/2008 | Homme | 359/554 |
| 2011/0013031 A1* | 1/2011 | Miyasako | 348/208.99 |
| 2011/0013896 A1* | 1/2011 | Kawahara | 396/55 |
| 2011/0141228 A1* | 6/2011 | Shimada | 348/36 |
| 2012/0033954 A1* | 2/2012 | Wakamatsu | 396/55 |
| 2012/0207457 A1* | 8/2012 | Miyasako | 396/55 |

FOREIGN PATENT DOCUMENTS

| | | | |
|---|---|---|---|
| JP | 11-064917 A | 3/1999 | |
| JP | 2000-180911 A | 6/2000 | |
| JP | 2001-075137 A | 3/2001 | |
| JP | 2002-148670 A | 5/2002 | |
| JP | 2005-258277 A | 9/2005 | |
| JP | 2006-201723 | 8/2006 | |
| JP | 2008-275826 A | 11/2008 | |
| JP | 2009-069618 A | 4/2009 | |
| JP | 2009-284101 A | 12/2009 | |

OTHER PUBLICATIONS

The above foreign patent documents were cited in the May 18, 2015 Japanese Office Action, which is enclosed without an English Translation, that issued in Japanese Patent Application No. 2011-199934.

* cited by examiner

F I G. 5

RELEASE SWITCH OFF

| | | SWITCH A | SWITCH B | SWITCH C | SWITCH D | SWITCH E |
|---|---|---|---|---|---|---|
| STABILITY DETERMINATION | STABLE | ALWAYS ON | ALWAYS ON | SELECT FIRST DIGITAL LOW-PASS FILTER | SELECT FIRST DRIVING LIMITER | ENABLE PANNING CONTROL |
| | UNSTABLE | | | | | |
| SHUTTER SPEED | Tv < 1/30sec OR Tv ≥ 1sec | | | | | |
| | 1/30sec ≤ Tv < 1sec | | | | | |

RELEASE SWITCH SW1 ON

| | | SWITCH A | SWITCH B | SWITCH C | SWITCH D | SWITCH E |
|---|---|---|---|---|---|---|
| STABILITY DETERMINATION | STABLE | OFF | OFF IN EVERY FIXED CYCLE | SELECT FIRST DIGITAL LOW-PASS FILTER | SELECT FIRST DRIVING LIMITER | DISABLE PANNING CONTROL |
| | UNSTABLE | ON | ALWAYS ON | | | ENABLE PANNING CONTROL |
| SHUTTER SPEED | Tv < 1/30sec OR Tv ≥ 1sec | | | | | |
| | 1/30sec ≤ Tv < 1sec | | | | | |

RELEASE SWITCH SW2 ON

| | | SWITCH A | SWITCH B | SWITCH C | SWITCH D | SWITCH E |
|---|---|---|---|---|---|---|
| STABILITY DETERMINATION | STABLE | OFF | OFF IN EVERY FIXED CYCLE | SELECT SECOND DIGITAL LOW-PASS FILTER | — | DISABLE PANNING CONTROL |
| | UNSTABLE | | | | | |
| SHUTTER SPEED | Tv < 1/30sec OR Tv ≥ 1sec | | | | SELECT FIRST DRIVING LIMITER | |
| | 1/30sec ≤ Tv < 1sec | | | | SELECT SECOND DRIVING LIMITER | |

| ZOOM POSITION | SHAKE COMPENSATION LENS DRIVING ANGLE (deg) | |
|---|---|---|
| | NORMAL (FIRST DRIVING LIMITER) | ENHANCED (SECOND DRIVING LIMITER) |
| Wide END | 0.3 | 0.3 |
| 1 | 0.3 | 0.3 |
| 2 | 0.3 | 0.3 |
| 3 | 0.3 | 0.3 |
| 4 | 0.3 | 0.3 |
| 5 | 0.3 | 0.4 |
| 6 | 0.3 | 0.4 |
| 7 | 0.3 | 0.4 |
| 8 | 0.3 | 0.4 |
| Tele END | 0.3 | 0.4 |

IMAGE STABILIZATION APPARATUS, IMAGE CAPTURE APPARATUS COMPRISING THE SAME, AND CONTROLLING METHODS THEREOF

BACKGROUND OF THE INVENTION

1. Field of the Invention

The present invention relates to an image stabilization apparatus, an image capture apparatus comprising an image stabilization apparatus, and control methods thereof and, more particularly, to an image stabilization apparatus having an image blur correcting function, an image capture apparatus comprising such an image stabilization apparatus, and control methods thereof.

2. Description of the Related Art

There has conventionally been known an image capture apparatus, including an image stabilization apparatus which detects a shake of the image capture apparatus and drives a movable member (shake compensation lens and its holding member) to correct image blur arising from the shake. Shake detection in the image stabilization apparatus often uses an angular velocity sensor. The angular velocity sensor vibrates a vibration member such as a piezoelectric element at a predetermined frequency, and outputs, as angular velocity information, a voltage corresponding to a Coriolis force generated from a rotational motion component. The image stabilization apparatus integrates the obtained angular velocity information to obtain the magnitude and direction of the shake, and outputs a correction position control signal to drive the movable member so as to cancel the image blur. When driving the movable member, the current position of the movable member is fed back as a movable member position signal to the image stabilization apparatus. The image stabilization apparatus performs feedback control to output a correction position control signal corresponding to the movable member position signal.

In some cases, the user intentionally moves the image capture apparatus. An example is panning shooting to shoot an image while moving (rotating) the image capture apparatus horizontally. If the image stabilization apparatus detects the panning operation as a shake and drives the movable member, the shake compensation lens has moved by a maximum amount (maximum driving position) by the end of the panning operation in a direction in which the shake generated by the panning operation is canceled. This is because a shake generated by the panning operation is generally too large to cancel even if the shake compensation lens is moved by a maximum amount. At the end of the panning operation, the shake compensation lens cannot be moved in this direction any more, and no satisfactory image blur correction can be performed. To solve this problem, there is known panning control to forcibly center the shake compensation lens position when the correction amount becomes large due to the panning operation.

When shooting a still image with an image capture apparatus including the image stabilization apparatus, the anti-shake capacity is desirably high. However, if panning control acts, though the user does not actually perform panning shooting, the anti-shake capacity becomes poor.

To achieve both panning control and the anti-shake capacity, it is proposed to shift quickly to panning control at a high shutter speed at which the influence of camera shake hardly appears, and shift less quickly to panning control at a low shutter speed at which the influence of camera shake readily appears (Japanese Patent Laid-Open No. 2006-201723).

However, the method disclosed in Japanese Patent Laid-Open No. 2006-201723 neither suppresses a phenomenon in which the shake compensation lens stays at the maximum driving position, nor suppresses degradation of the image quality caused by deviation of the shake compensation lens from the center of the optical axis of the imaging optical system while providing an anti-shake capacity necessary for the situation.

SUMMARY OF THE INVENTION

The present invention has been made to solve the conventional problems. The present invention provides an image stabilization apparatus capable of suppressing a phenomenon in which a shake compensation lens stays at a maximum driving position, and suppressing degradation of the image quality caused by deviation of the shake compensation lens from the center of the optical axis while providing an anti-shake capacity necessary for the situation, an image capture apparatus comprising such a image stabilization apparatus, and control methods thereof.

An image stabilization apparatus used in an image capture apparatus, comprising: a shake detection unit which detects a shake; and a control unit which moves, based on the shake detected by the shake detection unit, a correction member movable in a direction perpendicular to an optical axis of an imaging optical system of the image capture apparatus, and corrects an image blur caused by the shake, wherein when a shutter speed in shooting by the image capture apparatus is higher than a first predetermined value, the control unit sets a movable range of the correction member narrower than a movable range when the shutter speed in shooting by the image capture apparatus is lower than the first predetermined value, or wherein when the shutter speed in shooting by the image capture apparatus is lower than the first predetermined value and higher than a second predetermined value which is lower than the first predetermined value, the control unit sets the movable range of the correction member to be wider than a movable range when the shutter speed in shooting by the image capture apparatus is higher than the first predetermined value or lower than the second predetermined value.

An image capture apparatus comprising an image stabilization apparatus according to the present invention.

An image capture apparatus comprising: a correction member which moves in a direction perpendicular to an optical axis of an imaging optical system to correct an image blur generated in the imaging optical system, wherein the correction member is movable in a first range and a second range which is wider than the first range; a shake detection unit which detects a shake; and a control unit which moves the correction member based on the shake detected by the shake detection unit, wherein a shutter speed in shooting by the image capture apparatus when the correction member moves in the first range is higher than a shutter speed when the correction member moves in the second range.

A method of controlling an image stabilization apparatus which is used in an image capture apparatus and includes a shake detection unit which detects a shake, comprising: a control step of moving, based on the shake detected by the shake detection unit, a correction member movable in a direction perpendicular to an optical axis of an imaging optical system of the image capture apparatus, and correcting an image blur caused by the shake, wherein in the control step, when a shutter speed in shooting by the image capture apparatus is higher than a first predetermined value, the control unit sets a movable range of the correction member narrower than a movable range when the shutter speed in shooting by the image capture apparatus is lower than the first predetermined value, or wherein in the control step, when the shutter speed in shooting by the image capture apparatus is lower than the first predetermined value and higher than a second predetermined value which is lower than the first predetermined value, the control unit sets the movable range of the correction member to be wider than a movable range when the shutter speed in shooting by the image capture apparatus is higher than the first predetermined value or lower than the second predetermined value.

A method of controlling an image capture apparatus including a correction member which moves in a direction perpendicular to an optical axis of an imaging optical system to correct an image blur generated in the imaging optical system, wherein the correction member is movable in a first range and a second range which is wider than the first range, comprising: a shake detection step of detecting a shake; and a control step of moving the correction member based on the shake detected in the shake detection step, wherein a shutter speed in shooting by the image capture apparatus when the correction member moves in the first range is higher than a shutter speed when the correction member moves in the second range.

Further features of the present invention will become apparent from the following description of exemplary embodiments, with reference to the attached drawings.

BRIEF DESCRIPTION OF THE DRAWINGS

FIG. 5 is a table exemplifying the relationship between switches A to E in FIGS. 4A and 4B, the states of release switches, the result of determination by a stability determination unit, and the shutter speed;

DESCRIPTION OF THE EMBODIMENTS

Exemplary embodiments of the present invention will now be described in detail in accordance with the accompanying drawings.

Figure 1:
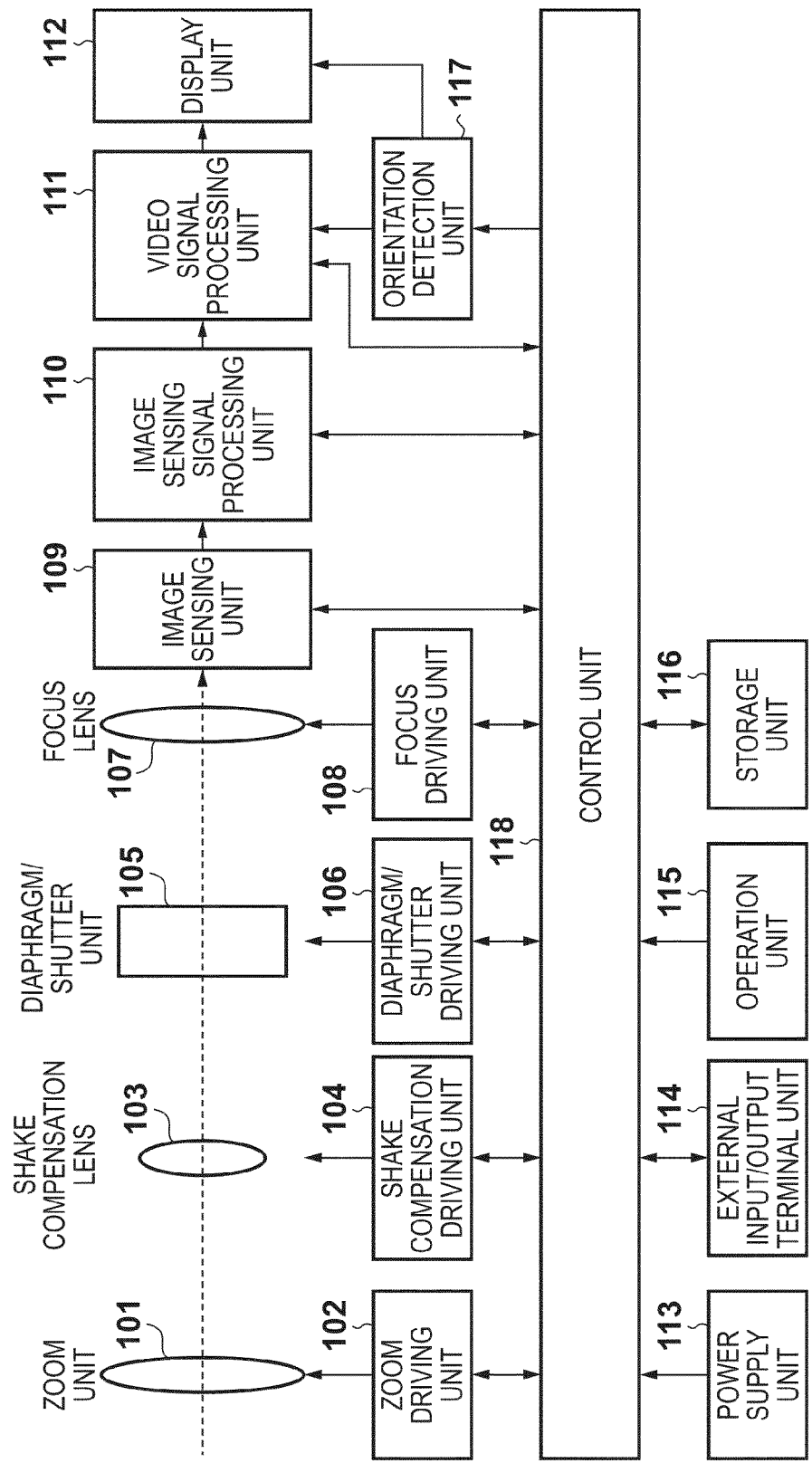
FIG. 1 is a block diagram exemplifying the functional arrangement of an image capture apparatus according to an embodiment of the present invention.

FIG. 1 is a block diagram exemplifying the functional arrangement of an image capture apparatus including an image stabilization apparatus according to an embodiment of the present invention. In the embodiment, an image capture apparatus 100 is a digital still camera, but may have a moving image shooting function.

A zoom unit 101 is part of a photographing lens which forms an imaging optical system. The zoom unit 101 includes a zoom lens for changing the lens magnification. A zoom driving unit 102 controls driving of the zoom unit 101 under the control of a control unit 118. A shake compensation lens 103 is movable in a direction perpendicular to the optical axis of the photographing lens. A shake compensation driving unit 104 controls driving of the shake compensation lens 103.

A diaphragm/shutter unit 105 is a mechanical shutter having the diaphragm function. A diaphragm/shutter driving unit 106 drives the diaphragm/shutter unit 105 under the control of the control unit 118. A focus lens 107 is part of the photographing lens, and can change its position along the optical axis of the photographing lens. A focus driving unit 108 drives the focus lens 107 under the control of the control unit 118.

An image sensing unit 109 converts an optical image formed via the photographing lens into an electrical signal of each pixel using an image sensor such as a CCD image sensor or CMOS image sensor. An image sensing signal processing unit 110 performs A/D conversion, correlated double sampling, gamma correction, white balance correction, color interpolation processing, and the like for the electrical signal output from the image sensing unit 109, and converts the electrical signal into a video signal (an image signal). A video signal processing unit 111 processes the video signal output from the image sensing signal processing unit 110 in accordance with an application purpose. More specifically, the video signal processing unit 111 generates a display video, and performs encoding processing and data file processing for recording.

A display unit 112 displays an image based on the display video signal output from the video signal processing unit 111, as needed. A power supply unit 113 supplies power to the entire image capture apparatus 100 in accordance with an application purpose. An external input/output terminal unit 114 receives/outputs communication signals and video signals from/to an external apparatus. An operation unit 115 includes buttons, switches, and the like for inputting instructions from the user to the image capture apparatus 100. A storage unit 116 stores various data such as video information. An orientation detection unit 117 detects the orientation of the image capture apparatus 100, and provides the orientation information to the video signal processing unit 111 and display unit 112. The control unit 118 includes, for example, a CPU, ROM, and RAM. The control unit 118 controls the respective units of the image capture apparatus by expanding, in the RAM, a control program stored in the ROM and executing it by the CPU, thereby implementing operations of the image capture apparatus 100, including various operations to be described later.

The operation unit 115 includes a release button configured to sequentially turn on a first switch SW1 and second switch SW2 in accordance with press amounts. The release switch SW1 is turned on when the release button is pressed about halfway, and the release switch SW2 is turned on when it is pressed fully. When the release switch SW1 is turned on, the control unit 118 performs, for example, auto focus detection by controlling the focus driving unit 108 based on an AF evaluation value based on a display video signal output from the video signal processing unit 111 to the display unit 112. Also, the control unit 118 performs AE processing to determine an f-number and shutter speed for obtaining an optimum exposure amount based on luminance information of the video signal and, for example, a predetermined program chart. When the release switch SW2 is turned on, the control unit 118 controls the respective units to shoot an image at the determined F-number and shutter speed and store image data obtained by the image sensing unit 109 in the storage unit 116.

The operation unit 115 includes an anti-shake switch capable of selecting an image-stabilization (shake compensation or anti-shake) mode. When the user selects the image-stabilization mode with the anti-shake switch, the control unit 118 instructs the shake compensation driving unit 104 about a shake compensation operation. Upon receiving the instruction, the shake compensation driving unit 104 executes the shake compensation operation until it is instructed about the cancelation of the shake compensation. The operation unit 115 includes a shooting mode selection switch capable of selecting either the still image shooting mode or moving image shooting mode. In each shooting mode, the operation condition of the shake compensation driving unit 104 can be changed.

The operation unit 115 also includes a playback mode selection switch for selecting a playback mode. In the playback mode, the shake compensation operation stops.

Further, the operation unit 115 includes a zoom switch for designating zooming. If the user designates zooming with the zoom switch, the zoom driving unit 102 receives the instruction via the control unit 118, drives the zoom unit 101, and moves it to the designated zoom position.

Which of the portrait and landscape directions is represented by a video signal from the video signal processing unit 111 is determined based on orientation information from the orientation detection unit 117, determining an image display direction on the display unit 112.

(Arrangement of Shake Compensation Driving Unit 104)

Figure 2:
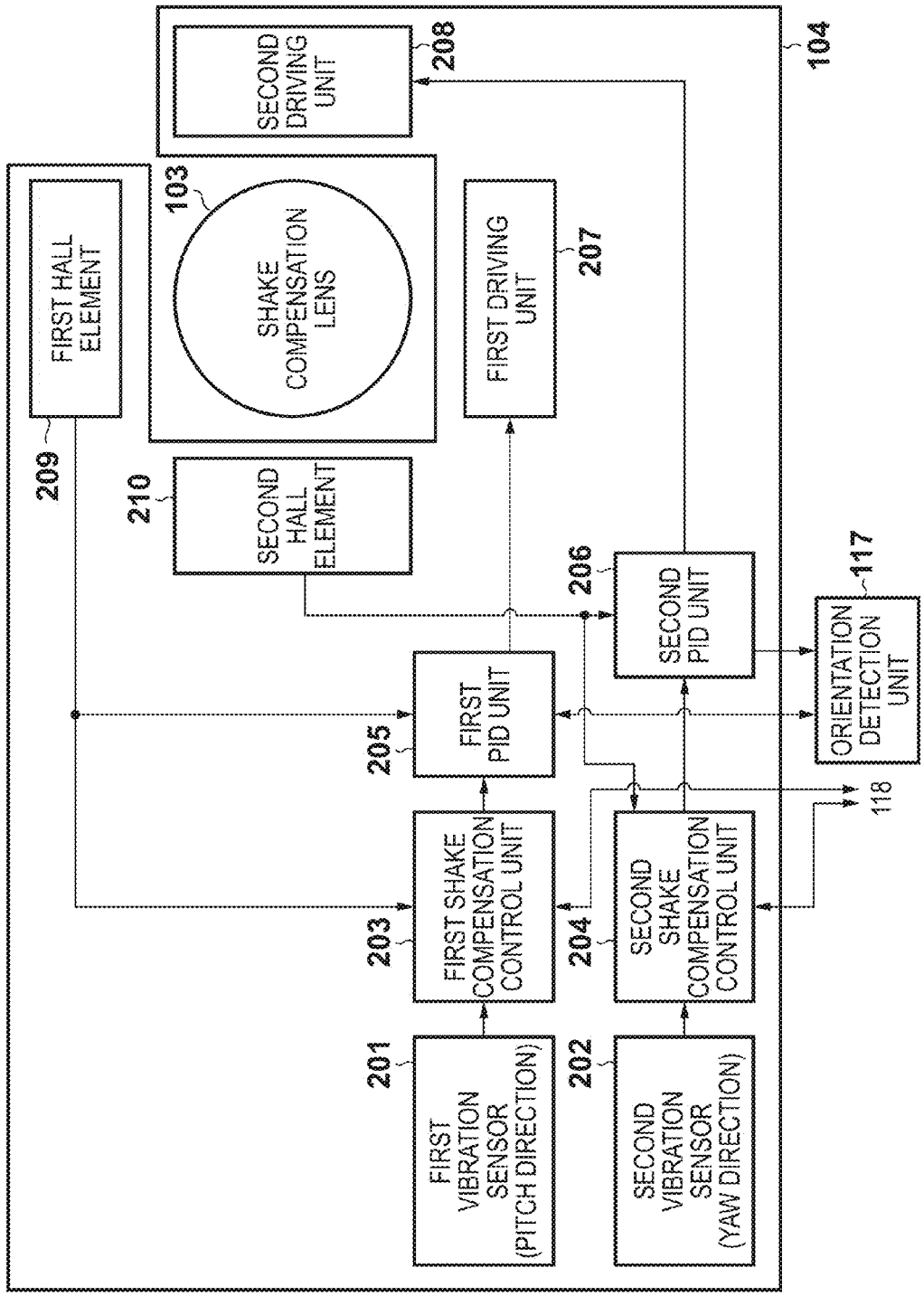
FIG. 2 is a block diagram exemplifying the arrangement of a shake compensation driving unit in FIG. 1.

FIG. 2 is a block diagram exemplifying the functional arrangement of the shake compensation driving unit 104.

A first vibration sensor 201 is, for example, an angular velocity sensor, and detects vibrations in the vertical direction (pitch direction) of the image capture apparatus 100 in a normal orientation (orientation in which the longitudinal direction of an image almost coincides with the horizontal direction). A second vibration sensor 202 is, for example, an angular velocity sensor, and detects vibrations in the horizontal direction (yaw direction) of the image capture apparatus in a normal orientation. First and second shake compensation control units 203 and 204 respectively output shake compensation lens correction position control signals in the pitch and yaw directions, and control driving of the shake compensation lens.

A first PID unit 205 drives a first driving unit 207, which is, for example, an actuator, by PID control in accordance with the correction position control signal in the pitch direction from the first shake compensation control unit 203, and position information of the shake compensation lens in the pitch direction from a first Hall element 209. Similarly, a second PID unit 206 drives a second driving unit 208, which is, for example, an actuator, by PID control in accordance with the correction position control signal in the yaw direction from the second shake compensation control unit 204, and position information of the shake compensation lens in the yaw direction from a second Hall element 210.

Outputs from the first and second PID units 205 and 206 are also supplied to the orientation detection unit 117 and used to detect the orientation of the image capture apparatus 100.

(Operation of Shake Compensation Driving Unit 104)

The driving control operation of the shake compensation lens 103 by the shake compensation driving unit 104 shown in FIG. 2 will be explained.

The first and second shake compensation control units 203 and 204 receive, from the first and second vibration sensors 201 and 202, shake signals (angular velocity signals) representing shakes of the image capture apparatus 100 in the pitch and yaw directions. Based on the shake signals, the first and second shake compensation control units 203 and 204 generate correction position control signals for driving the shake compensation lens 103 in the pitch and yaw directions, and output them to the first and second PID units 205 and 206, respectively.

The first and second Hall elements 209 and 210 output, as pieces of position information in the pitch and yaw directions of the shake compensation lens 103, signals having voltages corresponding to the strengths of magnetic fields generated by magnets attached to the shake compensation lens 103. The pieces of position information are supplied to the first and second PID units 205 and 206 and the first and second shake compensation control units 203 and 204. The first and second PID units 205 and 206 perform feedback control while driving the first and second driving units 207 and 208, so that signal values from the first and second Hall elements 209 and 210 converge to correction position control signal values from the first and second shake compensation control units 203 and 204.

Note that position signal values from the first and second Hall elements 209 and 210 vary. Thus, outputs from the first and second Hall elements 209 and 210 are adjusted to move the shake compensation lens 103 to a predetermined position in accordance with predetermined correction position control signals. At this time, the first and second PID units 205 and 206 execute PID control using P control (Proportional control), I control (Integral control), and D control (Derivative control).

The orientation detection unit 117 detects an orientation based on an integral compensation value used in the first PID unit 205. In PD control in which no I control is performed, the orientation detection unit detects an orientation based on difference amounts (deviation amounts) between the target position of the shake compensation lens 103 and detection positions detected by the first and second Hall elements 209 and 210.

Based on pieces of shake information from the first and second vibration sensors 201 and 202, the first and second shake compensation control units 203 and 204 output correction position control signals to move the shake compensation lens 103 in order to cancel an image blur. For example, the first and second shake compensation control units 203 and 204 can generate correction position control signals by performing filter processing or the like for the pieces of shake information (angular velocity signals). By the above operation, even if vibrations such as camera shake exist in the image capture apparatus 100 in shooting, image blur can be prevented up to a certain degree of vibrations. The first and second shake compensation control units 203 and 204 detect the panning state of the image capture apparatus 100 based on pieces of vibration information from the first and second vibration sensors 201 and 202 and outputs from the first and second Hall elements 209 and 210, and perform panning control.

(Image Stabilization Mechanism)

Figure 3:
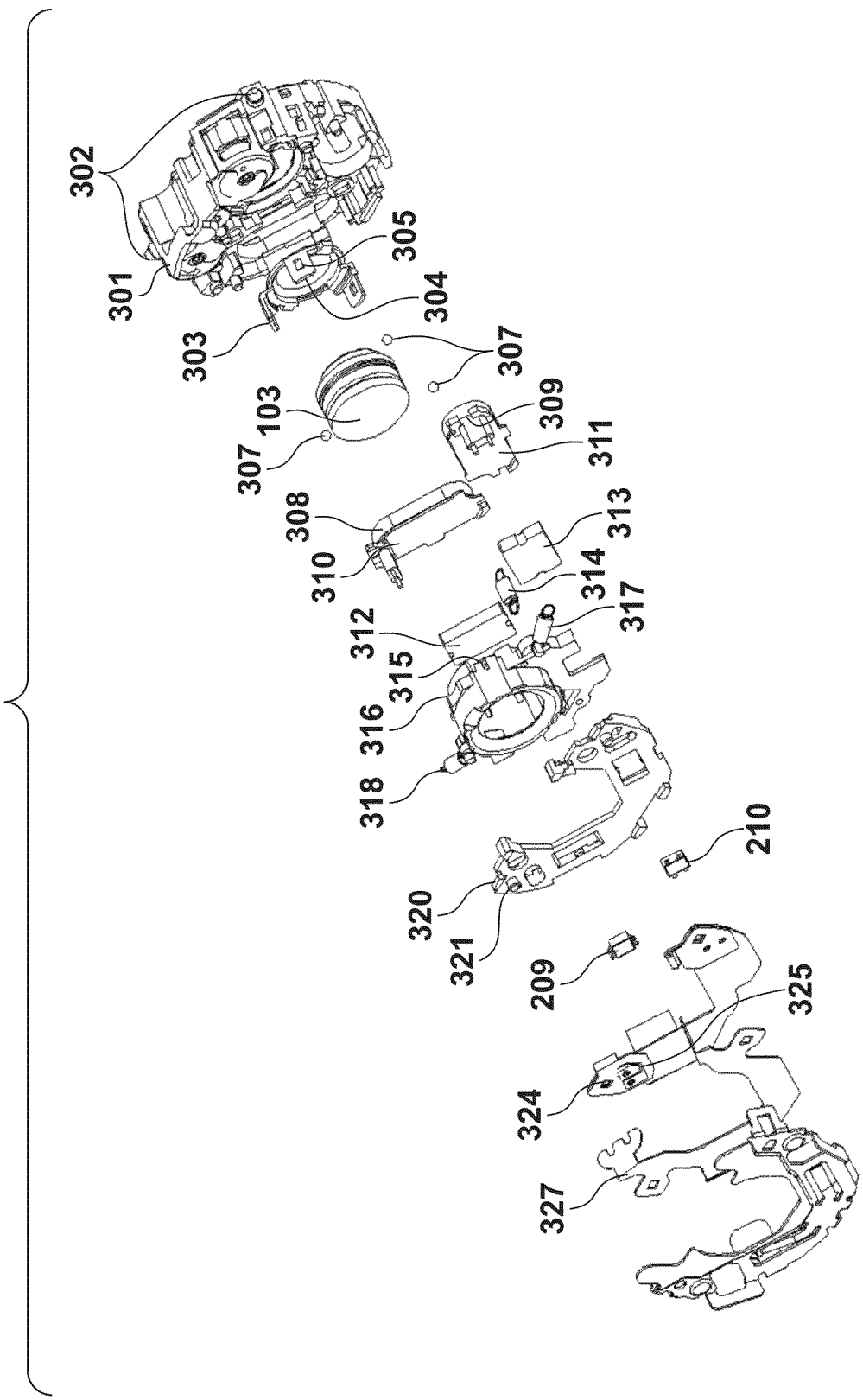
FIG. 3 is an exploded perspective view exemplifying the arrangement of an image stabilization mechanism according to the embodiment of the present invention.

FIG. 3 is an exploded perspective view exemplifying the detailed arrangement of an image stabilization mechanism corresponding to the shake compensation lens 103, shake compensation driving unit 104, diaphragm/shutter unit 105, and diaphragm/shutter driving unit 106.

A base 301 is the base of the image stabilization mechanism. The diaphragm/shutter unit 105 and an ND filter mechanism are also fixed to the base 301. Two follower pins 302 shown in FIG. 3 and a movable follower pin (not shown) are integrally formed on the base 301. These three follower pins are fitted in three cam grooves of a cam cylinder (not shown) outside the base 301 in the radial direction, and reciprocate along the cam grooves in the optical axis direction.

A holder 316 holds the shake compensation lens 103 using a caulking claw (not shown).

A lens cover 303 has an opening which limits a beam passing through the shake compensation lens 103. Openings 305 are respectively formed in three arms 304 extending from the side surface of the lens cover 303. Projections 315 formed at three portions on the side surface of the holder 316 are respectively fitted in the openings 305, integrally holding the lens cover 303 by the holder. The holder integrally holds magnets 312 and 313 mentioned above.

The holder 316 press-contacts the base 301 via three balls 307, and can move in an arbitrary direction within a plane perpendicular to the optical axis as the balls 307 roll. The arrangement in which the balls 307 hold the holder 316 can generate shorter-cycle vibrations with smaller amplitude than by an arrangement in which a guide bar guides a holder. Satisfactory correction can be performed even in an image capture apparatus including an image sensor with many pixels.

A thrust spring 314 is engaged at one end with the projection 315 of the holder 316, and at the other end with a projection (not shown) of the base 301. The thrust spring 314 is held while being stretched, and biases the holder 316 toward the base 301. Radial springs 317 and 318 prevent rotation of the holder 316.

Metal pins are integrally formed at the distal ends of resin bobbins 310 and 311, and the ends of coils 308 and 309 are tied. On a flexible board (FPC) 324, a land 325 is electrically connected to the pins of the bobbins 310 and 311 by soldering or the like, and forms a circuit which supplies power to the coils 308 and 309.

The first and second Hall elements 209 and 210 are arranged near the magnets 312 and 313, and detect magnetic fields generated by the magnets 312 and 313. The first and second Hall elements 209 and 210 are mounted on the FPC 324, and receive power via the FPC 324. An FPC 327 forms a circuit which supplies power to the diaphragm/shutter unit 105 and an ND filter driving unit. The FPCs 324 and 327 are fixed to a holder 320 via a projection 321.

Note that the above-described image stabilization mechanism is merely an example, and does not mean that characteristic effects of the present invention are not obtained unless the image stabilization mechanism is of this type. For example, the image sensor may be driven instead of the lens, or the guide bar may guide the holder. It is also possible to omit the thrust spring 314 and the radial springs 317 and 318, and bias the holder 316 toward the base 301 using the attraction force of the magnet.

(Arrangement of Shake Compensation Control Unit)

Figure 4A:
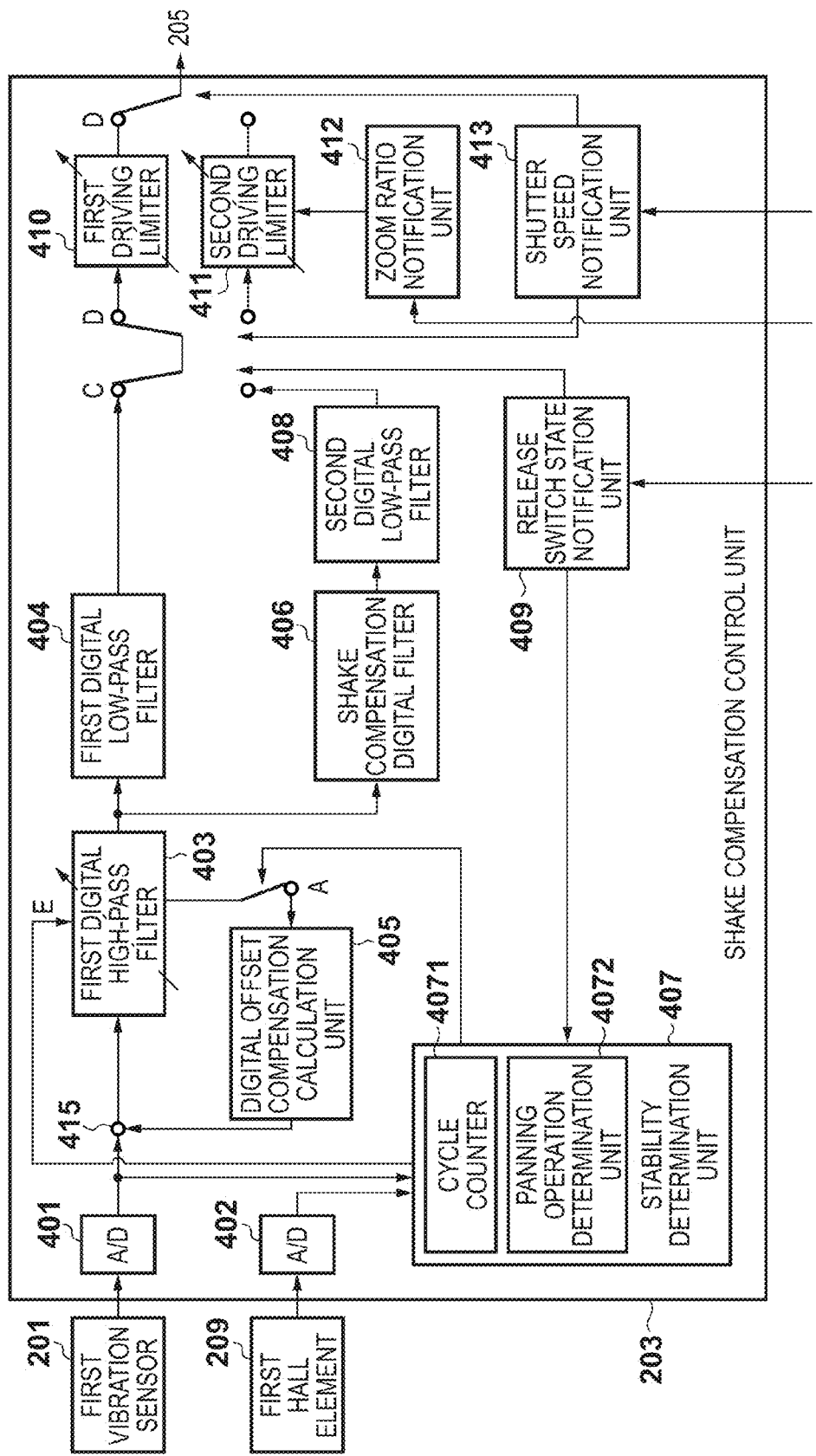
FIGS. 4A and 4B are block diagrams each exemplifying the functional arrangement of a shake compensation control unit according to the embodiment of the present invention.

FIG. 4A is a block diagram exemplifying the functional arrangement of the shake compensation control unit in the present invention. The first and second shake compensation control units 203 and 204 perform the same operation using the same arrangement, so the arrangement of the first shake compensation control unit 203 will be described below.

A first A/D converter (A/D) 401 converts a shake signal detected by the first vibration sensor 201 into a digital value. An adder 415 subtracts, from the digitally converted shake signal, a digital offset compensation value calculated by a digital offset compensation calculation unit 405, and outputs the resultant shake signal to a digital high-pass filter 403.

A second A/D converter 402 acquires position information of the shake compensation lens 103 from the first Hall element 209, converts it into a digital value, and outputs the digital value to a stability determination unit 407.

Figure 9:
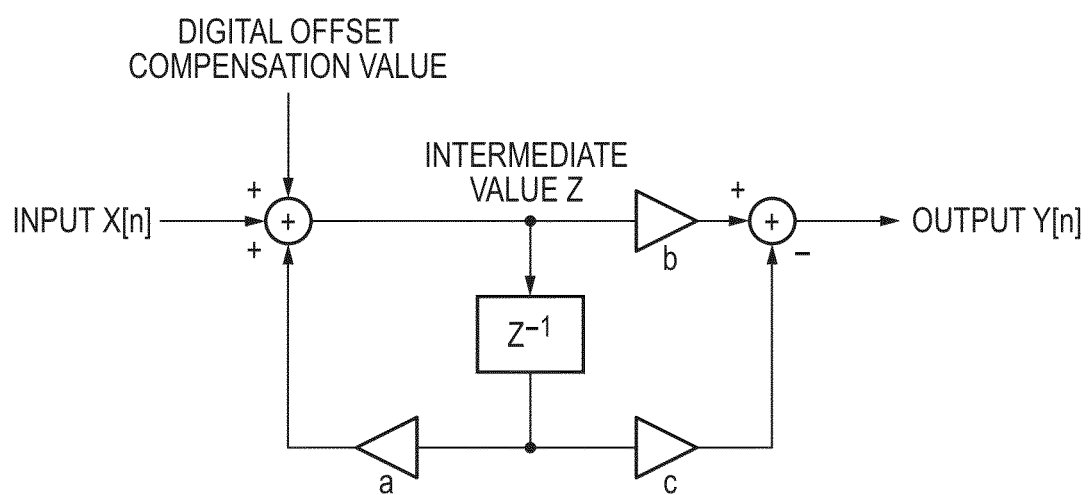
FIG. 9 is a circuit diagram of a digital filter for explaining digital offset compensation control according to the embodiment of the present invention.

A switch A is used to determine whether to update the digital offset value using the intermediate value of the digital high-pass filter 403 that is necessary for digital offset compensation calculation. The digital offset compensation will be explained with reference to FIG. 9. FIG. 9 is a circuit diagram showing the digital high-pass filter. A specific band component of an input X[n] is cut at a cutoff frequency determined by coefficients a, b, and c, calculating an output Y[n]. In this circuit diagram, an input added to the digital filter input is a digital offset compensation value, and is used to remove a rest state offset amount contained in the input X[n]. The digital offset compensation value is calculated and updated in a specific sampling cycle so that the intermediate value Z of the digital high-pass filter becomes 0.

Referring back to FIG. 4A, a release switch state notification unit 409 notifies the stability determination unit 407 of the states of the release switches SW1 and SW2 contained in the operation unit 115 of the image capture apparatus 100. The stability determination unit 407 includes a cycle counter 4071 and a panning operation determination unit 4072 which determines whether the image capture apparatus 100 is during the panning operation. The stability determination unit 407 executes optimum panning control during panning by changing the cutoff frequency of the digital high-pass filter 403. More specifically, the cutoff frequency of the digital high-pass filter 403 is increased during panning. If the correction amount increases owing to the operation of panning the image capture apparatus, the position of the shake compensation lens 103 is forcibly centered.

The shake signal processed by a shake compensation digital filter 406 is further processed by a second digital low-pass filter 408, and then output. Calculation operations by a first digital low-pass filter 404, the shake compensation digital filter 406, and the second digital low-pass filter 408 are parallelly processed in the same calculation sampling. A switch C selects either of outputs from the first and second digital low-pass filters 404 and 408 in accordance with the states of the release switches SW1 and SW2 that have been notified from the release switch state notification unit 409.

The shake signal selected by the switch C is clamped by either of the first and second driving limiters 410 and 411 in accordance with the state of a switch D. Note that the relationship between the camera shake correction angle and the lens moving amount changes depending on the focal distance of the photographing lens. Even if the correction angle is set constant regardless of the focal distance of the photographing lens, the driving distance of the shake compensation lens still depends on the focal distance of the photographing lens. Hence, the first and second driving limiters 410 and 411 change their upper limit values in accordance with the focal distance of the photographing lens that is notified from a zoom ratio notification unit 412.

Figures 6, 7A:
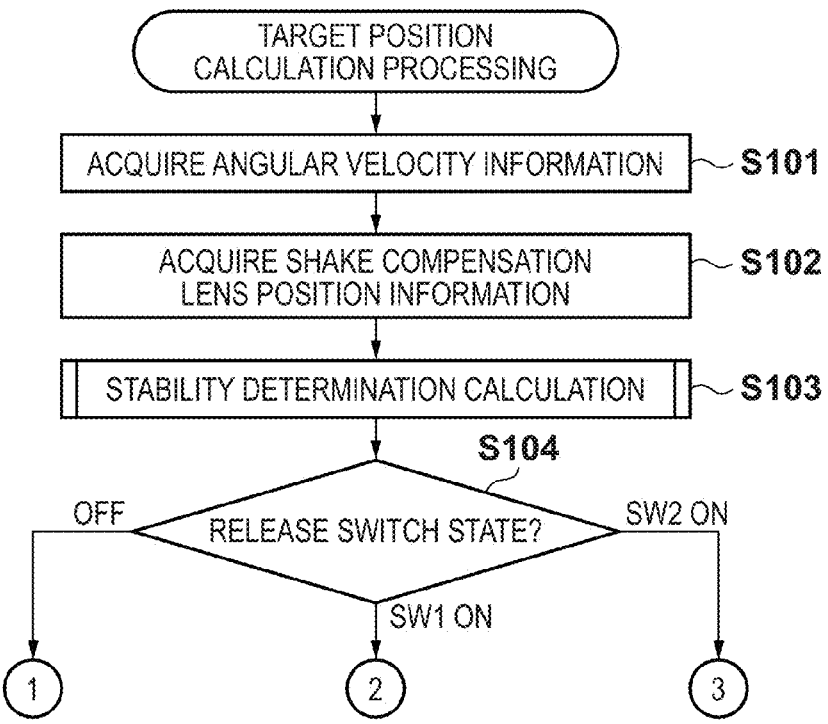
FIG. 6 is a table exemplifying the relationship between the zoom position and the shake compensation lens driving angle in shake compensation control according to the embodiment of the present invention.
FIG. 7A is a flowchart showing details of shake compensation lens target position calculation processing according to the embodiment of the present invention.

The first and second driving limiters may have different driving angles in accordance with the zoom position, as shown in FIG. 6, or the same driving angle at any zoom position. This example adopts a table in which the correction angle of the second driving limiter is larger than that of the first driving limiter on the Tele side where the anti-shake capacity is required much more. The switch D which operates based on the notification result of a shutter speed notification unit 413 selects either of shake compensation lens target positions clamped by the first and second driving limiters. The selected shake compensation lens target position is input as a shake compensation lens target position 414 to the first and second PID units 205 and 206.

Figure 4B:
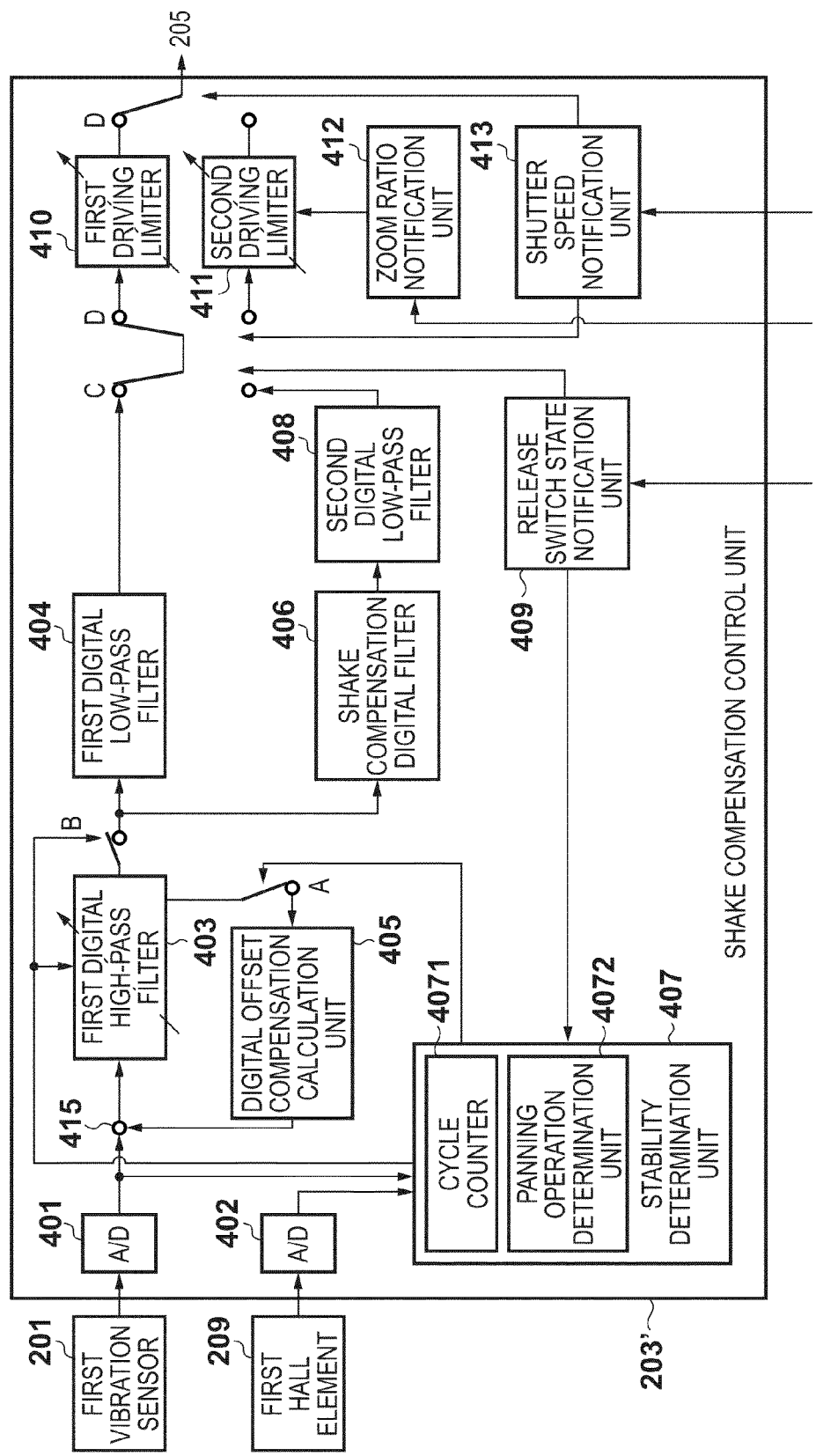

FIG. 4B is a block diagram exemplifying another arrangement of the first and second shake compensation control units 203 and 204. The arrangement of FIG. 4B is different from that of FIG. 4A in only an arrangement pertaining to panning control. More specifically, the arrangement of FIG. 4B employs a switch B which controls whether to input the result of calculation by the digital high-pass filter 403 to the digital low-pass filter 404 and shake compensation digital filter 406 in accordance with the determination result of the stability determination unit 407. If the switch B is OFF, the output of the digital high-pass filter 403 is connected to neither the digital low-pass filter 404 nor the shake compensation digital filter 406. In this case, the digital low-pass filter 404 and shake compensation digital filter 406 use, as an input, an output from the digital high-pass filter 403 in immediately preceding sampling. The cutoff frequency of the digital filter can be changed by changing sampling of filter calculation without changing the filter coefficient of the digital filter.

For example, assume that a high-pass filter having a cutoff frequency of 1 Hz in a digital filter calculation cycle of 1 kHz is designed, and a filter coefficient is determined. In this case, if calculation is executed only once in two 1-kHz filter calculation cycles without changing the filter coefficient, the calculation cycle of the digital filter corresponds to 500 Hz, and the cutoff frequency of the high-pass filter becomes 0.5 Hz which is half the design value. By changing the filter calculation cycle in this manner, the cutoff frequency can be changed.

In the shake compensation control units shown in FIGS. 4A and 4B, the states of the switches A to E are determined in accordance with the states of the release switches, the result of determination by the stability determination unit 407, and the shutter speed. FIG. 5 exemplifies the relationship between these conditions and the states of the switches. In FIG. 5, "—" means that the switch state is not affected by the corresponding conditions. The operation of switch control shown in FIG. 5 will be described later.

Details of a shake compensation control operation in the embodiment will be explained with reference to FIGS. 7A to 7D and 8.

Figure 7B:
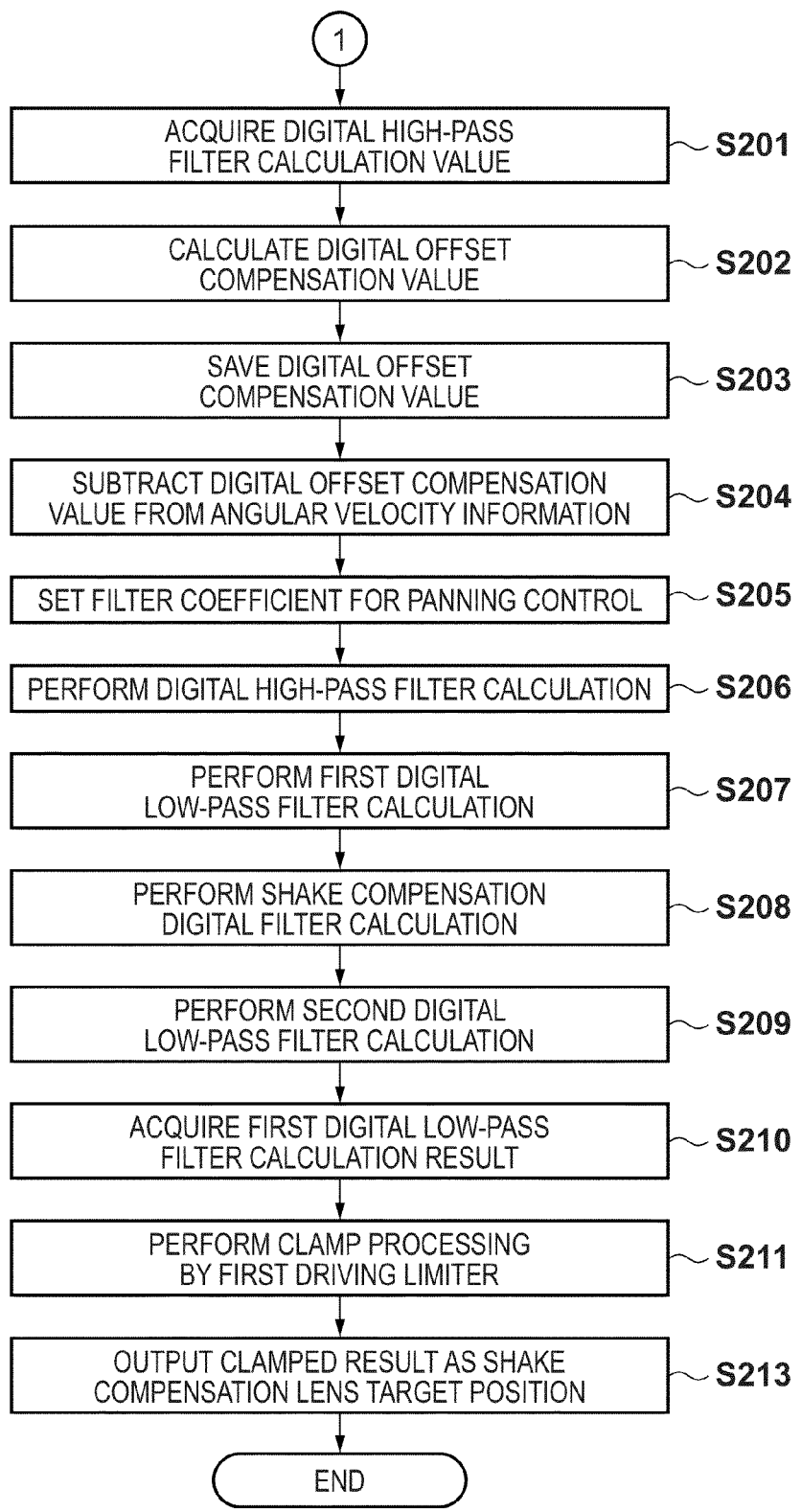
FIG. 7B is a flowchart showing details of the shake compensation lens target position calculation processing according to the embodiment of the present invention.
Figure 7C:
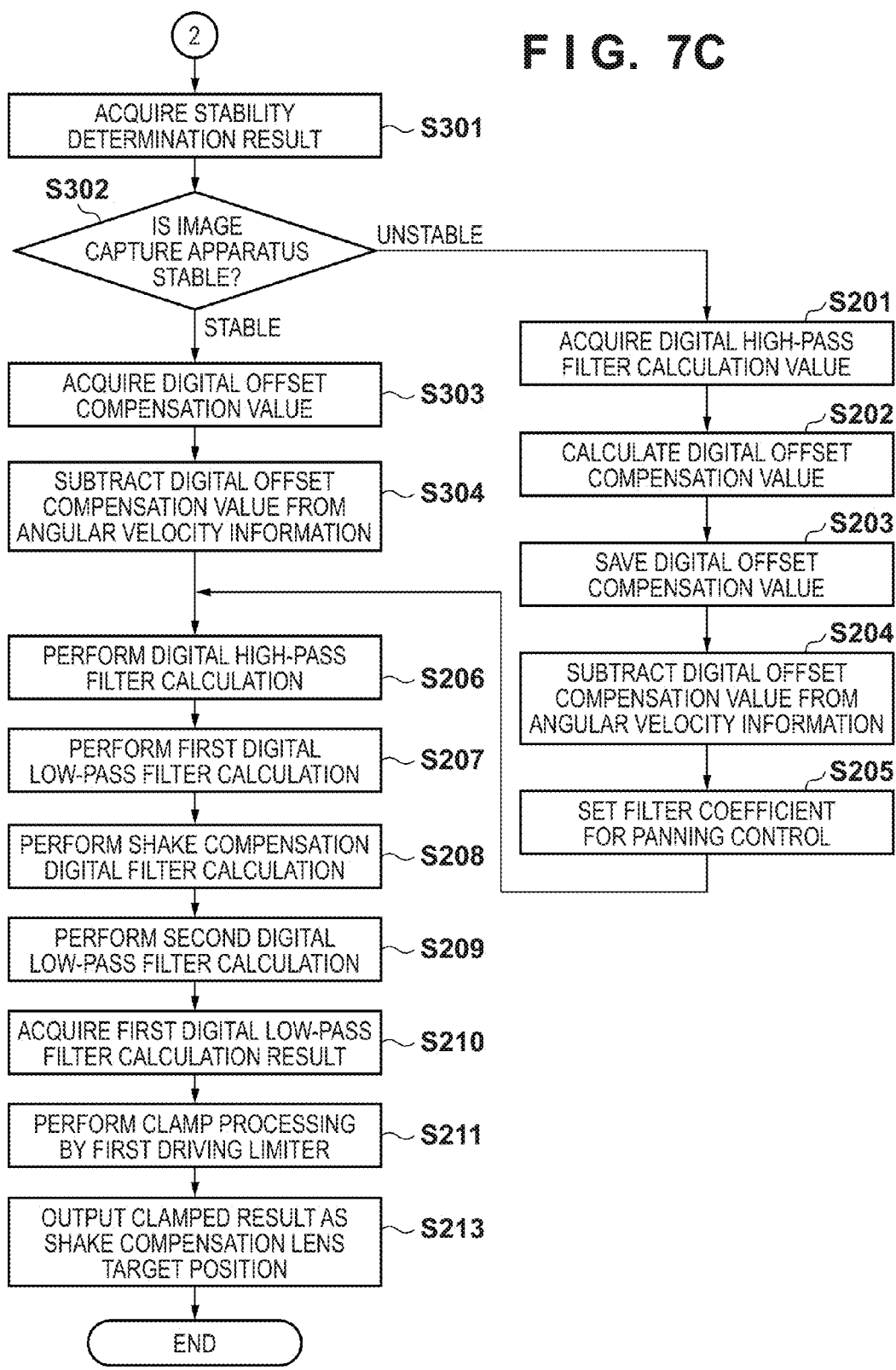
FIG. 7C is a flowchart showing details of the shake compensation lens target position calculation processing according to the embodiment of the present invention.
Figure 7D:
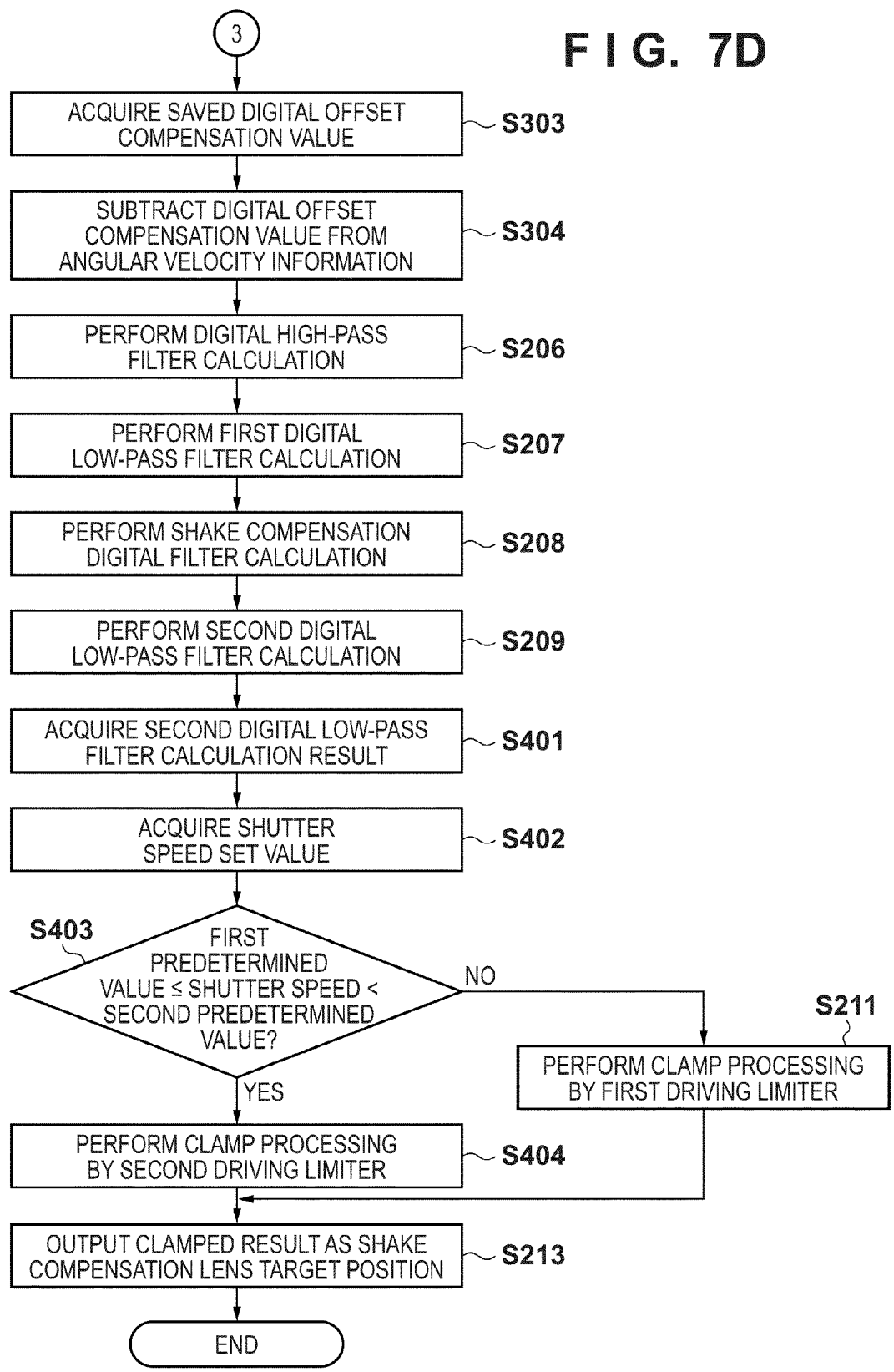
FIG. 7D is a flowchart showing details of the shake compensation lens target position calculation processing according to the embodiment of the present invention.
Figure 8:
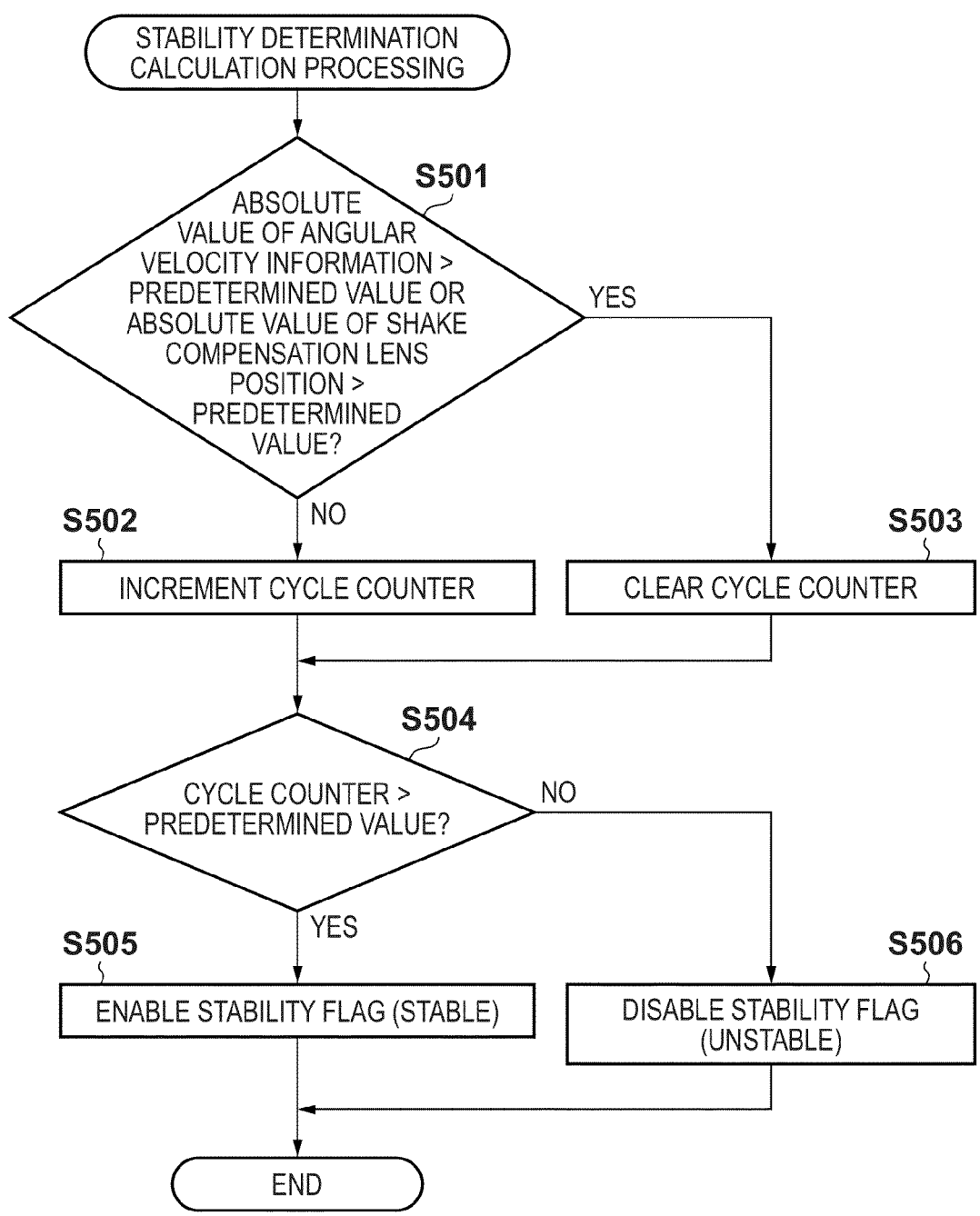
FIG. 8 is a flowchart showing details of the operation of the stability determination unit according to the embodiment of the present invention.

FIGS. 7A to 7D are flowcharts showing details of shake compensation lens target position calculation processing. FIG. 8 is a flowchart showing details of the operation of the stability determination unit 407.

Target position calculation processing is executed in every predetermined cycle. In FIG. 7A, when the target position calculation processing starts, the first A/D 401 acquires angular velocity information from the first vibration sensor 201 (step S101). The second A/D 402 acquires position information of the shake compensation lens 103 in the pitch direction from the first Hall element 209 (step S102). The stability determination unit 407 performs stability determination calculation (step S103). The release switch state notification unit 409 acquires the states of the release switches (step S104), and the process branches to three processes depending on the states of the release switches. If both of the release switches SW1 and SW2 are OFF, that is, not in the shooting state, processing in FIG. 7B is performed. If the release switch SW1 is ON and SW2 is OFF, processing in FIG. 7C is performed. If the release switch SW2 is ON (=SW1 is also ON), processing in FIG. 7D is performed.

Before a description of the processes in FIGS. 7B to 7D, details of the stability determination calculation processing performed in step S103 will be explained with reference to the flowchart of FIG. 8. The stability determination calculation processing is executed in a predetermined cycle.

The panning operation determination unit 4072 of the stability determination unit 407 determines whether at least one of the absolute value of angular velocity information that has been acquired by the first A/D 401 in step S101 and the absolute value of position information of the shake compensation lens 103 that has been acquired by the second A/D 402 in step S102 is larger than a predetermined value. If at least one absolute value is larger than the predetermined value, it is considered that the image capture apparatus 100 is shaken or being panned. Hence, the panning operation determination unit 4072 determines that the state of the image capture apparatus 100 is unstable, and the cycle counter 4071 is cleared (step S503).

If both the absolute value of angular velocity information and that of position information of the shake compensation lens 103 are equal to or smaller than the predetermined values, it is assumed that an object intended to be shot by the user does not move and that the user holds the image capture apparatus 100 firmly. Thus, the panning operation determination unit 4072 determines that the state of the image capture apparatus 100 is stable, and the cycle counter 4071 is incremented (step S502).

The panning operation determination unit 4072 determines whether the value of the cycle counter 4071 is larger than a predetermined value (step S504). If the value of the cycle counter 4071 is larger, the panning operation determination unit 4072 determines that the image capture apparatus 100 maintains a stable state continuously for a predetermined time, and enables a stability flag (step S505). If the value of the cycle counter 4071 is equal to or smaller than the predetermined value, the panning operation determination unit 4072 determines that the image capture apparatus 100 is unstable, and disables the stability flag (step S506).

Next, processing after the branch in step S104 of FIG. 7A will be explained.

If both the release switches SW1 and SW2 are OFF, the image capture apparatus is highly likely to be unstable. Thus, processing independent of the stability determination result and shutter speed is executed (FIG. 7B).

When the release switch state notification unit notifies the stability determination unit 407 that both the release switches SW1 and SW2 are OFF, the stability determination unit 407 turns on the switch A. Then, the digital offset compensation calculation unit 405 acquires the intermediate value of the digital high-pass filter 403 (step S201), calculates a digital offset compensation value (step S202), and saves the calculated digital offset compensation value (step S203). The adder 415 subtracts the saved digital offset compensation value in order to remove the influence of an offset, temperature drift, and the like contained in angular velocity information output from the first A/D 401 (step S204).

The stability determination unit 407 outputs the disabled stability flag to control the switch E of the digital high-pass filter 403 to enable panning control. In response to this, the digital high-pass filter 403 increases the cutoff frequency (step S205). In the arrangement of FIG. 4B, the switch B is turned on.

The digital high-pass filter 403 performs filter processing at the high cutoff frequency (step S206). The first digital low-pass filter 404 performs filter processing for the result (step S207), converting the angular velocity into an angle. At the same time, the shake compensation digital filter 406 performs filter processing for the angular velocity information processed by the digital high-pass filter 403 (step S208). Further, the second digital low-pass filter 408 performs filter processing (step S209), converting the angular velocity into an angle.

The first and second digital low-pass filters 404 and 408 parallelly execute processes in order to select later which of filter outputs is used. The two filter processes are parallelly executed in every calculation sampling so that filter calculation outputs do not discontinue.

The first digital low-pass filter 404 has a cutoff frequency at which the shake compensation lens 103 is prevented from staying at the maximum driving position even if the image capture apparatus 100 is in an unstable state, for example, during the panning operation.

The shake compensation digital filter 406 and second digital low-pass filter 408 have cutoff frequencies at which the shake compensation lens 103 readily stays at the maximum driving position, compared to the first digital low-pass filter 404, but the anti-shake capacity increases even at a low frequency.

If both the release switches SW1 and SW2 are OFF, importance is put not on increase of the anti-shake capacity in the low frequency band but on prevention of the shake compensation lens 103 from staying at the maximum driving position. For this purpose, the release switch state notification unit 409 controls the switch C to select an output from the first digital low-pass filter 404 (step S210). The shutter speed notification unit 413 controls the switch D to select the first driving limiter regardless of the shutter speed. The first driving limiter 410 clamps the output from the first digital low-pass filter 404 (step S211). An output from the first driving limiter 410 is output as a lens target position to the first PID unit 205 (step S213).

Processing when the release switch SW1 is ON and SW2 is OFF will be explained with reference to FIG. 7C.

This state is a shooting preparation state, and a focusing operation to the object, calculation of exposure conditions, and the like are performed. The anti-shake capacity in the low frequency band is desirably increased to provide the user with an object image which remains as still as possible. If the panning operation is performed while increasing the anti-shake capacity, the shake compensation lens 103 readily stays at the maximum driving position. To prevent this, when it is determined that the image capture apparatus is unstable, priority is given not to improvement of the anti-shake characteristic but to prevention of the shake compensation lens 103 from staying at the maximum driving position.

The stability determination unit 407 acquires the stability determination result (stability flag) of the image capture apparatus that has been obtained in step S103 (step S301). If it is determined that the image capture apparatus 100 is stable, and the stability flag is enabled, the stability determination unit 407 turns off the switch A, and controls the switch E to disable panning control. Disabling panning control increases the anti-shake capacity in the low frequency band. In the arrangement of FIG. 4B, the switch B is turned off cyclically (for example, n times of the calculation cycle (integer of n≥2)). This can decrease the cutoff frequencies of the first digital low-pass filter 404 and shake compensation digital filter 406, and increase the anti-shake capacity.

If the switch A is OFF, the digital offset compensation calculation unit 405 acquires a saved digital offset compensation value immediately before pressing SW1 that has been saved in step S203 when the release switch is OFF. The digital offset compensation calculation unit 405 supplies the acquired digital offset compensation value to the adder 415 (step S303). The adder 415 subtracts, from angular velocity information output from the first A/D 401, the digital offset compensation value obtained when the release switch is OFF (step S304).

After that, the same digital filter processes as those in steps S206 to S213 of FIG. 7B are performed. A result obtained by clamping the calculation result of the first digital low-pass filter 404 by the first driving limiter 410 is set as a target lens position.

If it is determined in step S302 that the stability flag is disabled (the image capture apparatus 100 is unstable), the processes in steps S201 to S213 are executed, similar to the release OFF state.

Finally, processing when the release switch SW2 is turned on will be explained with reference to FIG. 7D.

When the release switch SW2 is turned on, actual shooting starts, and the anti-shake capacity is most needed. If enabling/disabling of panning control and update/non-update of the digital offset compensation value are switched during exposure, calculation by the digital filter becomes discontinuous, and image blurring may occur. To prevent this, filter processing which maximizes the anti-shake capacity is performed regardless of the stability determination result of the image capture apparatus 100.

Since the digital offset compensation value is not updated, the stability determination unit 407 turns off the switch A. In the arrangement of FIG. 4B, the switch B is turned off cyclically (for example, n times of the calculation cycle (integer of n≥2)). This decreases the cutoff frequencies of the first digital low-pass filter 404 and shake compensation digital filter 406, and increases the anti-shake capacity.

Similar to the case in which the release switch SW1 is ON and the image capture apparatus 100 is stable, a saved digital offset compensation value is subtracted from angular velocity information (steps S303 and S304). In steps S206 to S209, the digital filters 404, 406, and 408 process the angular velocity information from which the digital offset compensation value has been subtracted.

When the release switch SW2 is ON, the release switch state notification unit 409 controls the switch C to select an output from the second digital low-pass filter 408 in order to give top priority to the anti-shake capacity.

The shutter speed notification unit 413 acquires a shutter speed in actual shooting (step S402), and controls the switch D to clamp an output from the second digital low-pass filter 408 by either the first driving limiter 410 or second driving limiter 411 in accordance with the shutter speed. Note that the second driving limiter 411 clamps an output at a value larger than that by the first driving limiter 410. The lens movable range becomes wider in the case of clamping by the second driving limiter 411, and even a large camera shake angle can be corrected.

In step S403, the shutter speed notification unit 413 determines whether the shutter speed Tv in actual shooting satisfies the first predetermined value≤Tv<the second predetermined value. For example, the first predetermined value is 1/30 sec, and the second predetermined value is 1 sec.

(a) If the shutter speed Tv is lower than the first predetermined value (1/30 sec), that is, higher than 1/30, the shutter speed notification unit 413 controls the switch D to select the first driving limiter 410 (step S211). When the exposure time is short, the possibility at which the photographing lens moves greatly during the exposure time is low, so the movable range of the shake compensation lens 103 is narrowed. Even if the image capture apparatus 100 is shaken greatly during exposure, the shake compensation lens 103 can be prevented from staying at the maximum driving position. Since an image can be captured near the center of the optical axis, degradation of the image quality at the periphery of the image can be suppressed, and a high-resolution image can be shot.

(b) If the shutter speed Tv is equal to or higher than the first predetermined value (1/30 sec), that is, equal to or lower than 1/30 and higher than the second predetermined value (1 sec), the shutter speed notification unit 413 controls the switch D to select the second driving limiter 411 (step S404). As a result, the movable range of the shake compensation lens 103 is widened. Even a large camera shake can be corrected, and image degradation caused by the camera shake can be corrected.

(c) If the shutter speed Tv is equal to or lower than the second predetermined value (1 sec), the shutter speed notification unit 413 controls the switch D to select the first driving limiter (step S211). This is because, when the exposure time is long, the moving amount of the shake compensation lens 103 from the optical axis during exposure becomes large. This control widens the movable range of the shake compensation lens in long exposure time in order to prevent the shake compensation lens 103 from staying at the maximum driving position and increase the anti-shake capacity. However, as the exposure time becomes longer, the moving amount of the shake compensation lens 103 from the optical axis becomes larger. Even if the movable range of the shake compensation lens 103 is widened, it becomes difficult to prevent the shake compensation lens 103 from staying at the maximum driving position. If the shake compensation lens 103 stays at the maximum driving position while the movable range is widened, the image quality at the periphery of the image degrades more greatly owing to the large moving amount from the center of the optical axis. For this reason, when the exposure time is long to a certain degree (shutter speed is equal to or lower than the second predetermined value), the movable range of the shake compensation lens 103 is not widened.

In short,
a case in which the shutter speed is higher than the first predetermined value is a state in which the lens movable range is narrow (first driving limiter 410), a case in which the shutter speed is equal to or lower than the first predetermined value and higher than the second predetermined value is a state in which the lens movable range is wide (second driving limiter 411), and a case in which the shutter speed is equal to or lower than the second predetermined value is a state in which the lens movable range is narrow (first driving limiter 410).

In the embodiment, the lens movable range is narrow (first driving limiter 410) in both the case in which the shutter speed is higher than the first predetermined value and the case in which the shutter speed is lower than the second predetermined value. However, "narrow" does not mean either one of predetermined choices "wide" and "narrow", but simply means that the lens movable range is narrower than that of the second driving limiter 411. That is, the lens movable range need not be equal between the case in which the shutter speed is higher than the first predetermined value and the case in which the shutter speed is lower than the second predetermined value. Lens movable ranges in the respective cases suffice to be narrower than that by the second driving limiter 411. For example, in long exposure time, the lens moves much more than in short-second exposure. Thus, in the case in which the shutter speed is higher than the first predetermined value, the lens movable range may be wider than that in the case in which the shutter speed is lower than the second predetermined value.

In this case, the lens movable range satisfies an inequality:
lens movable range in the case in which the shutter speed is higher than the first predetermined value<lens movable range in the case in which the shutter speed is equal to or lower than the first predetermined value and higher than the second predetermined value (second driving limiter 411)<lens movable range in the case in which the shutter speed is equal to or lower than the second predetermined value Needless to say, in the case in which the shutter speed is higher than the first predetermined value, the lens movable range may be wider than that in the case in which the shutter speed is lower than the second predetermined value as long as the lens movable ranges are narrower than that by the second driving limiter 411.

As described above, according to the embodiment, the driving range of the shake compensation lens and enabling/disabling of panning control can be controlled appropriately in consideration of the states of the release switches, whether the image capture apparatus is stable, or the shutter speed. Especially in shake compensation control in actual shooting, when the shutter speed is equal to or lower than the first predetermined value or higher than the second predetermined value which is lower than the first predetermined value, importance is put on the anti-shake capacity, and the driving range of the shake compensation lens is set to be wider than those in other cases. Degradation of the image quality can therefore be suppressed while preventing the shake compensation lens from staying at the maximum driving position.

Other Embodiments

The embodiment has exemplified the digital camera. However, the image stabilization apparatus according to the present invention is also usable in another form and may be used in, for example, a digital video camera. The image stabilization apparatus is also usable in an optical device such as a lens barrel used in a mobile phone or electronic device, an interchangeable lens for a digital single-lens reflex camera, or a lens for an interchangeable-lens digital video camera.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-199934, filed on Sep. 13, 2011, which is hereby incorporated by reference herein its entirety.

What is claimed is:

1. An image stabilization apparatus used in an image capture apparatus, comprising:
a control unit which moves, based on a shake detected by a shake detection unit, a correction member movable in a direction perpendicular to an optical axis of an imaging optical system of the image capture apparatus, and corrects an image blur caused by the shake, wherein a maximum movable range of the correction member determines a maximum movable distance of the correction member from the optical axis and determines a correctable maximum camera shake angle,
wherein when the shutter speed in shooting by the image capture apparatus is lower than the first predetermined value and higher than a second predetermined value which is lower than the first predetermined value, said control unit sets the maximum movable range of the correction member to be wider than the maximum movable range set when the shutter speed in shooting by the image capture apparatus is higher than the first predetermined value or lower than the second predetermined value.

2. The image stabilization apparatus according to claim 1, further comprising a determination unit which determines, based on a magnitude of the shake detected by said shake detection unit and a position of the correction member, whether a state of the image capture apparatus is stable,
wherein when a panning operation is detected, said control unit executes panning control in which the position of the correction member is forcibly centered, and
wherein when the image capture apparatus is in a shooting preparation state, if said determination unit determines that the state of the image capture apparatus is stable, said control unit disables the panning control, and if said determination unit determines that the state of the image capture apparatus is unstable, said control unit enables the panning control.

3. The image stabilization apparatus according to claim 2, wherein in the shooting preparation state, said control unit sets the maximum movable range of the correction member to be equal to a range when the shutter speed is higher than the first predetermined value or equal to or lower than the second predetermined value.

4. The image stabilization apparatus according to claim 2, wherein said control unit comprises a filter unit which limits a frequency band of a signal representing the shake detected by said shake detection unit, and a limiter unit which clamps an output from the filter unit at a predetermined value, and said control unit moves the correction member using an output from the limiter unit.

5. The image stabilization apparatus according to claim 4, wherein in the shooting preparation state, when said determination unit determines that the state of the image capture apparatus is stable, said control unit decreases a cutoff frequency of the filter unit to be lower than a cutoff frequency when said determination unit determines that the state of the image capture apparatus is unstable.

6. The image stabilization apparatus according to claim 4, wherein in shooting, said control unit decreases a cutoff frequency of the filter unit to be lower than a cutoff frequency in a state other than the shooting preparation state or shooting, regardless of determination by said determination unit.

7. The image stabilization apparatus according to claim 4, wherein
the limiter unit comprises a first driving limiter unit, and a second driving limiter unit which clamps an output at a value larger than a value by the first driving limiter unit, and
said control unit moves the correction member using an output from the second driving limiter unit when the shutter speed in shooting is equal to or lower than the first predetermined value and higher than the second predetermined value which is lower than the first predetermined value, and uses an output from the first driving limiter unit when the shutter speed is higher than the first predetermined value and when the shutter speed is equal to or lower than the second predetermined value.

8. The image stabilization apparatus according to claim 1, wherein the maximum movable range of the correction member is set to be equal between a case in which the shutter speed in shooting is lower than the first predetermined value and a case in which the shutter speed is higher than the second predetermined value.

9. An image capture apparatus comprising an image stabilization apparatus defined in claim 1.

10. A method of controlling an image stabilization apparatus which is used in an image capture apparatus, comprising:
a control step of moving, based on a shake detected by a shake detection unit, a correction member movable in a direction perpendicular to an optical axis of an imaging optical system of the image capture apparatus, and correcting an image blur caused by the shake, wherein a maximum movable range of the correction member determines a maximum movable distance of the correction member from the optical axis and determines a correctable maximum camera shake angle,
wherein in the control step, when the shutter speed in shooting by the image capture apparatus is lower than the first predetermined value and higher than a second predetermined value which is lower than the first predetermined value, the maximum movable range of the correction member wider than the movable range set when the shutter speed in shooting by the image capture apparatus is higher than the first predetermined value or lower than the second predetermined value, is set.

* * * * *